April 10, 1928.

C. C. HANSEN

AIR LINE OILER

Filed March 1, 1927

1,665,497

INVENTOR.
Charles C. Hansen
BY
HIS ATTORNEYS.

Patented Apr. 10, 1928.

1,665,497

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

AIR-LINE OILER.

Application filed March 1, 1927. Serial No. 171,854.

This invention relates to oiling devices, but more particularly to an air line oiler adapted to be attached to a hose or pipe line used for conveying pressure fluid from a source of supply to machines intended to be actuated thereby, such as rock drills, air motors and the like.

The objects of the invention are to insure a uniform and adequate supply of lubricant to fluid actuated machines and to prevent frequent interruptions in the operation of such machines for the purpose of supplying lubricant thereto.

Other objects will appear hereinafter.

Figure 1:
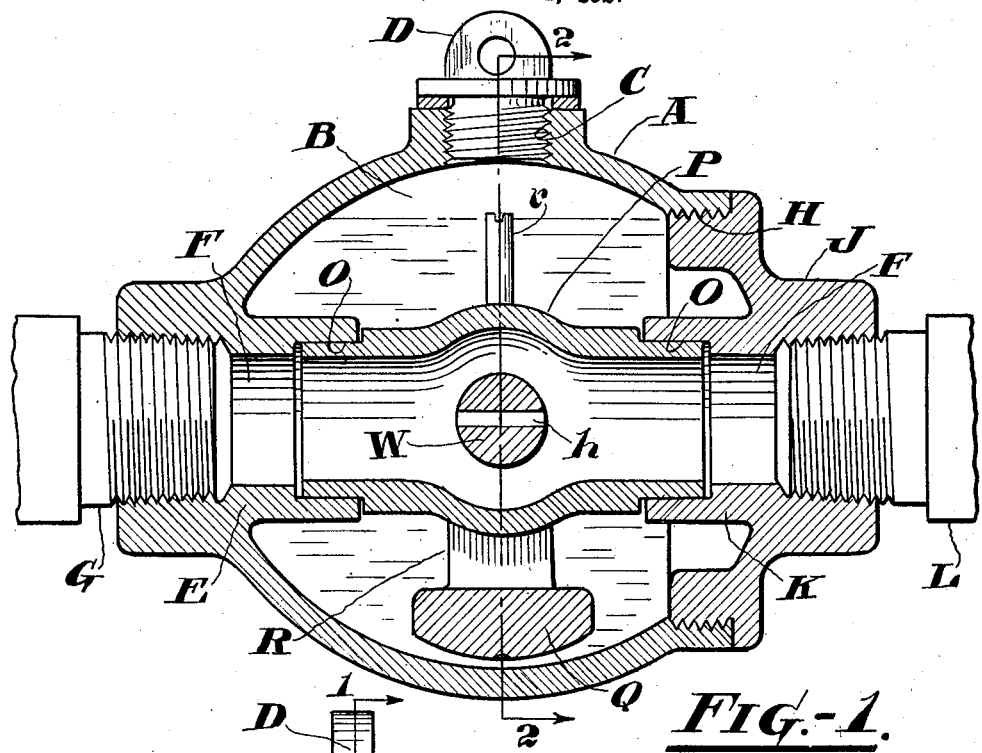
Figure 2:
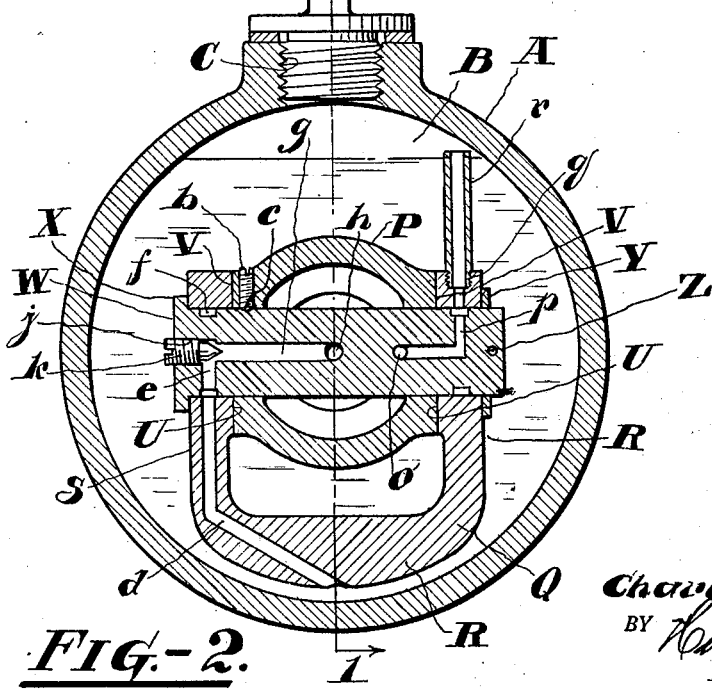

In the drawings in which is illustrated a preferred modification of the invention, Figure 1 is a longitudinal sectional elevation of an air line oiler constructed in accordance with the practice of the invention, and Figure 2 is a transverse sectional elevation taken through Figure 1 on the line 2—2 in the direction indicated by the arrows.

Referring to the drawings, the invention comprises a casing A, the interior B of which forms a reservoir for oil or other suitable lubricant which may be introduced into the casing through an aperture C normally sealed by a filling plug D. At one end of the casing is formed a projection E having a passageway F therethrough for the passage of pressure fluid. The outer end of the passageway F is conveniently threaded to cooperate with a connection G of an air line which may lead from a source of pressure fluid supply (not shown).

In the opposite side of the casing A is formed an enlarged threaded aperture H to receive a correspondingly threaded plug J which, like the casing, is also provided with a projection K having a passageway F threaded at its outer end to cooperate with a section L of the air line. The inner ends of the passageways F are preferably enlarged as at O to form bearings for the ends of a tube P disposed rotatably in the projections E and K to bridge the passageways F of which it forms a part for conveying pressure fluid through the casing from one section of the air line to the other.

Suitable means are provided for preventing rotation of the tube about its longitudinal axis with the casing whenever the position of the casing is changed during the drilling operation. To that end is provided a weight Q having a pair of lateral arms R and S adapted to bear with their inner surfaces U against cooperating surfaces V of the tube P. In order to enable the weight Q to adjust its position with respect to the lowermost point of the reservoir in the various positions which the casing may assume, a pivot in the form of a pin W projects through the ends of the arms R and S and through the tube P and is held against longitudinal movement in one direction by an integral flange X on one end thereof. In order to hold the pin against such movement in the opposite direction, the opposite end of the pin is permitted to extend beyond the side arm R to receive a washer Y which may bear against the arm R and is held in position by a pin Z extending through the end of the pin W. In the present instance the pin W is held against rotation with respect to the tube P by a set screw $b$ which engages a notch $c$ in the periphery of the pin W.

Formed in the weight Q is a passage $d$ which leads from the lowermost point in the weight Q through the side arm S and communicates with a passage $e$ in the pin W through an annular external groove $f$, also in the pin W. Leading from the passage $e$ to a point intermediate the ends of the pin W is a longitudinal passage $g$ which terminates in a transverse passage $h$ formed through the pin W. The passages described are provided for the purpose of delivering oil from the reservoir into the tube P. The passage $h$ is therefore preferably so positioned that it will be parallel to the line of flow of pressure fluid through the tube.

The outermost end of the passage $g$ is in this instance threaded as at $j$ to receive a threaded needle valve $k$ which extends into the passage $g$, preferably at the juncture of said passage and the passage $e$, for regulating the area of the passage $g$ at this point, thus providing a convenient means for controlling the volume of oil which may pass through the passages from the reservoir to the tube P.

In order to insure an adequate supply of pressure fluid in the reservoir to act on the surface of the oil, a transverse passage $o$ is formed through the pin W to communicate with a passage $p$ leading to the surface of the pin W, preferably at a point intermediate the sides of the side arm R, in which arm is formed a passage $q$ to register with the passage $p$. The outer end of the passage $q$ is threaded and into this threaded aperture is screwed a pipe $r$ which is of a suitable length to enable its outer or free end to extend above the surface of the oil in the reservoir.

The operation of the device is as follows: A portion of the pressure fluid, such as compressed air, entering the passageways F from the air line will flow through the passage $o$ and associated passages and through the pipe $r$ into the reservoir and create a pressure therein substantially equal to the pressure flowing through the passageways. After the tool or machine to which the lubricant is supplied is set in operation, the pressure in the air line will drop slightly below that in the reservoir so that a slight unbalancing effect is obtained between these two points. This unbalanced state is maintained throughout the operation of the tool, owing to the pulsations due to the admission and cut-off of pressure fluid into the tool. Such pulsations in the reservoir will have the effect of forcing oil from the reservoir through the passages $d$, $e$, $g$ and $h$ where, due to the current of pressure fluid therethrough, the oil will be drawn into the main pressure fluid current in the tube P and will be carried thereby to the tool intended to be oiled.

As will be understood, the quantity of oil which may be delivered to the tube P may be readily varied to suit existing conditions. If oil of low viscosity is used and only a single machine is being supplied therewith, the needle valve may be adjusted so that only a small passage exists between said valve and the wall of the passage $g$. If, however, a greater supply is required or if oil of greater viscosity is used, the needle valve may be opened to suit the immediate requirement.

Owing to the manner in which the weight Q is secured to the tube P, a constant supply of oil to the main air current will at all times be assured, irrespective of the position of the casing A. If, for instance, the casing A be rolled about its longitudinal axis, as frequently happens where the air line is being constantly shifted from one position to the other, the weight Q will prevent rotation of the tube P and will thus insure against immersion of the free end of the pipe $r$ in the oil. In like manner, when the casing A is tipped so that it inclines from the horizontal, the weight Q will rock freely about the pin W and will thus assure that the inlet opening of the passage $d$ will at all times occupy the lowermost position in the reservoir and thus enable practically the entire supply of oil in the reservoir to be consumed after each filling. This is a very advantageous feature since it enables the casing to be constructed of a size which will not be unwieldy and of excessively heavy weight to move about. Moreover, it will eliminate the necessity of frequent interruptions in the drilling or other operation for the purpose of replenishing the supply of oil in the reservoir.

I claim:

1. An air line oiler comprising a casing forming a reservoir for oil, projections in the casing having passageways for pressure fluid, a tube connecting the passageways, said tube being rotatable in the passageways, and means pivoted on the tube having a passage for conveying oil from the reservoir into the passageway, said means having a weighted portion to constantly maintain the inlet opening of the passage in the lowermost portion of the reservoir.

2. An air line oiler comprising a casing forming a reservoir for oil, projections in opposite sides of the casing having pasageways for pressure fluid, a tube supported rotatably by the projections to connect the passageways, means pivoted to and suspended from the tube, said means having a passage for conveying oil from the reservoir into the passageway, a weight on said means to constantly maintain the inlet opening of the passage in the lowermost portion of the reservoir, and means for controlling the flow of oil through the passage.

3. An air line oiler comprising a casing forming a reservoir for oil, projections in opposite sides of the casing having passageways for pressure fluid, a tube supported rotatably by the projections to connect the passageways, arms on opposite sides of the tube, a passage in one of the arms, a weight connecting the outer ends of the arms tending to maintain the inlet opening of the passage in the lowermost portion of the casing, a pin extending through the tube to form a pivot for the arms, a passage in the pin communicating with the passage in the arm for conveying oil from the reservoir into the tube, a needle valve in the pin controlling the flow of oil through the passages, communicable inlet passages in the pin and one of the arms for conveying pressure fluid from the tube into the reservoir, and a pipe carried by one of the arms forming a continuation of the inlet passages for carrying pressure fluid through the oil to act on the surface thereof.

In testimony whereof I have signed this specification.

CHARLES C. HANSEN.